US010709064B2

(12) United States Patent
Curtis et al.

(10) Patent No.: US 10,709,064 B2
(45) Date of Patent: Jul. 14, 2020

(54) PROPULSION CONTROL LOCKOUT AND GROUND WORKING VEHICLE INCORPORATING SAME

(71) Applicant: THE TORO COMPANY, Bloomington, MN (US)

(72) Inventors: Aaron Y. Curtis, Eagan, MN (US); Khari S. Clarke, Minneapolis, MN (US)

(73) Assignee: THE TORO COMPANY, Bloomington, MN (US)

( * ) Notice: Subject to any disclaimer, the term of this patent is extended or adjusted under 35 U.S.C. 154(b) by 228 days.

(21) Appl. No.: 15/885,011

(22) Filed: Jan. 31, 2018

(65) Prior Publication Data
US 2019/0230852 A1    Aug. 1, 2019

(51) Int. Cl.
*A01D 34/68*  (2006.01)
*A01D 34/82*  (2006.01)
*A01D 101/00*  (2006.01)

(52) U.S. Cl.
CPC ....... *A01D 34/6806* (2013.01); *A01D 34/824* (2013.01); *A01D 2034/6843* (2013.01); *A01D 2101/00* (2013.01)

(58) Field of Classification Search
CPC ....... Y10S 56/18; B05G 5/08; F16H 59/0278; F16C 1/10; F16C 2310/00; F16B 7/1454; B60Y 2200/225; A01D 2034/6843; A01D 2101/00; A01D 34/6806; A01D 34/76; A01D 34/824
See application file for complete search history.

(56) References Cited

U.S. PATENT DOCUMENTS

| 2,247,333 A | 6/1941 | Funk |
| 2,329,952 A | 9/1943 | Speiser |
| 2,513,685 A | 7/1950 | Smith et al. |
| 2,601,752 A | 7/1952 | Rose |
| 2,645,300 A | 7/1953 | Watts et al. |
| 2,791,079 A | 5/1957 | Funk |
| 3,079,743 A | 3/1963 | Egley |
| 4,295,326 A | 10/1981 | Green |

(Continued)

FOREIGN PATENT DOCUMENTS

| CA | 595999 A | 4/1960 |
| DE | 27 34 109 A1 | 2/1979 |

(Continued)

*Primary Examiner* — Arpad Fabian-Kovacs
(74) *Attorney, Agent, or Firm* — Mueting, Raasch & Gebhardt, P.A.

(57) ABSTRACT

A control system for a ground working vehicle. The control system may include a handle assembly including a handle member extending upwardly and rearwardly from a chassis of the vehicle. The control system may also include a speed control apparatus including a control grip operably connected to, and translatable along, the handle member. Translation of the control grip may activate a transmission to move the chassis in the forward direction when the control grip is translated downwardly along the handle member towards the chassis. Further, the control system may include a lockout apparatus movably attached to a handle member. The lockout apparatus may be adapted to selectively and physically restrict movement of the control grip relative to the handle member.

19 Claims, 8 Drawing Sheets

(56) References Cited

U.S. PATENT DOCUMENTS

| | | | |
|---|---|---|---|
| 4,558,558 A | 12/1985 | Horner, Jr. et al. | |
| 4,611,502 A * | 9/1986 | Gregory | F02D 11/02 |
| | | | 74/502 |
| 4,704,847 A | 11/1987 | Greider et al. | |
| 4,835,949 A | 6/1989 | Seyerle | |
| 4,878,339 A | 11/1989 | Marier et al. | |
| 5,138,824 A | 8/1992 | Oshima et al. | |
| 5,146,735 A | 9/1992 | McDonner | |
| 5,155,985 A | 10/1992 | Oshima et al. | |
| 5,203,147 A | 4/1993 | Long | |
| 5,251,711 A | 10/1993 | Meyer et al. | |
| 5,261,214 A | 11/1993 | Wollersheim | |
| 5,343,678 A | 9/1994 | Stuart | |
| 5,375,674 A | 12/1994 | Peter | |
| 5,415,059 A * | 5/1995 | Hein | A01D 34/6812 |
| | | | 192/224.1 |
| 5,511,367 A | 4/1996 | Powers et al. | |
| 5,542,241 A | 8/1996 | Lydy et al. | |
| 5,657,828 A | 8/1997 | Nagamachi | |
| 5,692,366 A | 12/1997 | Hardesty | |
| 5,701,967 A | 12/1997 | Barnard | |
| 5,803,847 A | 9/1998 | Kamm | |
| 6,082,083 A | 7/2000 | Stalpes et al. | |
| 6,105,348 A | 8/2000 | Turk et al. | |
| 6,161,637 A | 12/2000 | Decker et al. | |
| 6,668,529 B2 * | 12/2003 | Busboom | A01D 34/6806 |
| | | | 56/10.8 |
| 7,178,322 B2 * | 2/2007 | Osborne | A01D 34/824 |
| | | | 56/10.8 |
| 7,540,131 B2 | 6/2009 | Stover et al. | |
| 9,263,975 B2 | 2/2016 | Wang et al. | |
| 9,399,846 B2 * | 7/2016 | Friberg | E01H 5/045 |
| D777,795 S * | 1/2017 | Martin | D15/11 |
| 9,546,462 B2 * | 1/2017 | Friberg | E01H 6/00 |
| 9,556,572 B2 * | 1/2017 | Duchscherer | B62D 11/02 |
| 9,677,648 B2 * | 6/2017 | Wadzinski | F16H 7/0827 |
| 2003/0084655 A1 * | 5/2003 | Rush | A01D 34/6806 |
| | | | 56/194 |
| 2006/0053763 A1 * | 3/2006 | Stover | A01D 34/824 |
| | | | 56/16.7 |
| 2013/0139485 A1 * | 6/2013 | Wadzinski | A01D 43/0636 |
| | | | 56/320.2 |
| 2015/0108728 A1 * | 4/2015 | Nie | F16B 7/1418 |
| | | | 280/47.371 |
| 2017/0367258 A1 * | 12/2017 | Shaffer | A01D 34/6806 |
| 2017/0367259 A1 * | 12/2017 | Shaffer | A01D 34/6806 |
| 2018/0116119 A1 * | 5/2018 | Wu | A01D 34/6806 |
| 2019/0307066 A1 * | 10/2019 | Jiang | A01D 34/00 |

FOREIGN PATENT DOCUMENTS

| | | |
|---|---|---|
| EP | 0 185 513 A1 | 6/1986 |
| FR | 2237566 A1 | 2/1975 |
| GB | 741321 A | 11/1955 |

* cited by examiner

PROPULSION CONTROL LOCKOUT AND GROUND WORKING VEHICLE INCORPORATING SAME

BACKGROUND

Embodiments of the present disclosure relate generally to ground working vehicles and, more particularly, to a vehicle control system incorporating a propulsion control lockout.

Self-propelled walk-behind mowers are commonly used by homeowners and landscape professionals alike. Walk-behind mowers are adept at both mowing lawns with numerous obstacles (e.g., trees, shrubs, flowerbeds, and the like) that necessitate intricate trimming maneuvers, and mowing lawns that may otherwise be ill-suited to high-speed riding mowers. Moreover, walk-behind mowers are often used when mowing areas with steep slopes.

Many walk-behind mowers have a propulsion system that propels the mower at a variable ground speed. Typically, a control system is located on a handle of the mower that allows the operator to engage and disengage the propulsion system and to select a desired ground speed. One type of control system includes a handle grip that slides up and down relative to the mower handle. For example, U.S. Pat. No. 6,082,083 to Stalpes et al. and U.S. Pat. No. 7,540,131 to Stover et al. (which are both herein incorporated by reference) describe a handle grip that: slides forwardly down the mower handle to increase ground speed; and rearwardly up the mower handle to decrease ground speed. As a result, the slidable handle grip may automatically adapt the ground speed of the mower to the speed of the walking operator.

SUMMARY

Embodiments described herein may provide a control system for a ground working vehicle and associated methods that may simplify vehicle operation. For example, in one embodiment, the control system may include a handle assembly, a speed control apparatus, and a lockout apparatus. The handle assembly may include a handle member extending upwardly and rearwardly from a chassis of the vehicle. The speed control apparatus may include a control grip operably connected to, and translatable along, the handle member. Translation of the control grip may activate a transmission to move the chassis in a forward direction when the control grip is translated downwardly along the handle member towards the chassis. The lockout apparatus may be movably attached to the handle member. The lockout apparatus may be adapted to selectively and physically restrict movement of the control grip relative to the handle member.

In another embodiment, a walk-behind power mower may include a chassis, a prime mover supported by the chassis, a handle assembly, a variable speed transmission, a speed control apparatus, and a lockout apparatus. The chassis may be supported upon a ground surface by a plurality of ground-engaging wheels. The handle assembly may include a handle member extending upwardly and rearwardly from the chassis. The handle member may include a lower end attached to the chassis and an upper end. The variable speed transmission may be supported by the chassis. The transmission may selectively rotate at least one of the ground-engaging wheels to effect propulsion of the chassis over the ground surface. The speed control apparatus may include a control grip positioned at or near the upper end of, and translatable along, the handle member. Translation of the control grip downwardly along the handle member may activate the transmission to effect propulsion of the chassis in a forward direction. The lockout apparatus may be movably attached to the handle member. The lockout apparatus may be adapted to selectively and physically restrict translation of the control grip along the handle member.

In yet another embodiment, a walk-behind power mower may include a chassis, a prime mover supported by the chassis, a handle assembly, a variable speed transmission, a speed control apparatus, and a tubular lockout apparatus. The chassis may be supported upon a ground surface by a plurality of ground-engaging wheels. The handle assembly may include a handle member extending upwardly and rearwardly from the chassis. The handle member may include a lower end attached to the chassis, an upper end, and at least one handle tube extending between the lower and upper ends. The variable speed transmission may be supported by the chassis. The transmission may selectively rotate at least one of the ground-engaging wheels to effect propulsion of the chassis over the ground surface. The speed control apparatus may include a control grip positioned at or near the upper end of, and translatable along, the handle member. Translation of the control grip downwardly along the handle member may activate the transmission to effect propulsion of the chassis in a forward direction. The tubular lockout apparatus may be movably attached to and surrounding at least a portion of the at least one handle tube between the chassis and the control grip. The lockout apparatus may be adapted to selectively and physically restrict movement of the control grip relative to the handle member such that the control grip is prevented from activating the transmission. The lockout apparatus may be configurable between a locked position and an unlocked position. When in the locked position, the lockout apparatus may be adjacent to or in contact with the control grip and physically restricts the movement of the control grip relative to the handle member. And when in the unlocked position, the lockout apparatus may be spaced apart from and allows with the movement of the control grip relative to the handle member.

The above summary is not intended to describe each embodiment or every implementation. Rather, a more complete understanding of illustrative embodiments will become apparent and appreciated by reference to the following Detailed Description of Exemplary Embodiments and Claims in view of the accompanying figures of the drawing.

BRIEF DESCRIPTION OF THE VIEWS OF THE DRAWING

Exemplary embodiments will be further described with reference to the figures of the drawing, wherein.

Figure 1A:
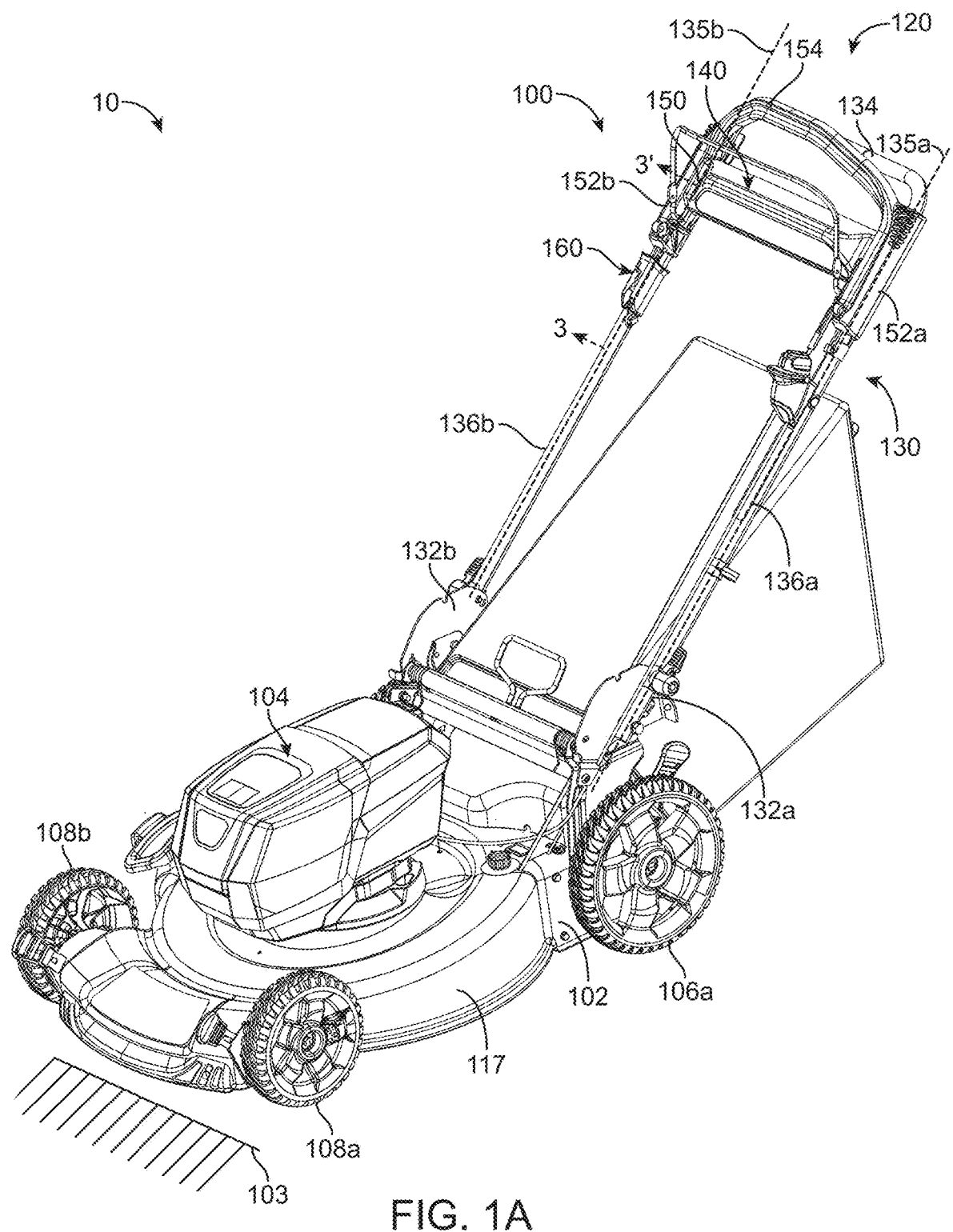
FIG. 1A is a perspective view of a ground working vehicle (e.g., a self-propelled walk-behind lawn mower) having a control system in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Still further, "Figure x" and "FIG. x" may be used interchangeably herein to refer to the figure numbered "x."

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated. Unless otherwise indicated, all numbers expressing quantities, and all terms expressing direction/orientation (e.g., vertical, horizontal, parallel, perpendicular, etc.) in the specification and claims are to be understood as being modified in all instances by the term "about."

Generally speaking, embodiments of the present disclosure may be directed to control systems for controlling various aspects of a power ground working vehicle (e.g., a self-propelled walk-behind lawn mower). The control system may include a speed control apparatus movably connected to a handle assembly of the mower and adapted to control ground speed of the mower. For example, as the speed control apparatus is moved in a forward direction relative to the handle assembly, the ground speed of the mower increases proportionally, and as the speed control apparatus is moved in a rearward direction relative to the handle assembly, the ground speed of the mower decreases proportionally. As a result, forward forces applied to the speed control apparatus may result in the mower being propelled in a forward direction (e.g., via an engine and transmission of the mower).

In some instances, it may be desirable to lock the speed control apparatus into place or restrict the speed control apparatus from moving (e.g., in a neutral position). When the speed control apparatus is restricted from moving, a forward force placed upon the speed control apparatus would not move the speed control apparatus forward relative to the handle assembly (and thus would not cause the mower to be propelled in a forward direction). An operator may want to restrict the mower from being self-propelled by the engine (i.e., in a neutral drive configuration) for a variety of different reasons. For example, the operator may want to prevent incidental contact from moving the speed control apparatus or may want to manually push the mower without assistance from engine propulsion. Specifically, by restricting movement of the speed control apparatus relative to the handle assembly (e.g., restricting the speed control apparatus in a neutral position), the operator can move the mower only through application of a manual force (e.g., the operator pushing the handle assembly and, thus, the mower). Further, restricting movement of the speed control apparatus may help to conserve energy of the prime mover (e.g., when using an electric motor, restricting movement of the speed control apparatus may save battery power) as power from the prime mover would no longer be required to propel the mower. Further yet, when manually pushing the mower with the prime mover off, the rolling resistance of the drive system may be reduced by preventing engagement of the speed control apparatus. In other words, the mower may be easier to manually move when the speed control apparatus is restricted and the prime mover is off.

Therefore, embodiments of the present disclosure may include a control system having a lockout apparatus that is adapted to selectively and physically restrict movement of the speed control apparatus relative to the handle assembly. In other words, for example, the lockout apparatus may be moved by the operator (e.g., by directly moving the lockout apparatus) such that it impedes movement of the speed control apparatus (e.g., by physically restricting movement of the speed control apparatus) to position the speed control apparatus in, e.g., a neutral position. In other words, the lockout apparatus may move between a first position (e.g., an unlocked position) in which the speed control apparatus may move freely relative to the handle assembly, and a second position (e.g., a locked position) in which the speed control apparatus is generally immobilized relative to the handle assembly.

With reference to the figures of the drawing, wherein like reference numerals designate like parts and assemblies throughout the several views, FIG. 1A illustrates a ground working vehicle in accordance with exemplary embodiments of the present disclosure. While shown in this view as a self-propelled, ground working vehicle, e.g., a walk-behind lawn mower 10 (also referred to herein simply as a "vehicle" or "mower"), such a configuration is not limiting. That is, while embodiments are described herein with respect to a walk-behind mower, those of skill in the art will realize that this disclosure is equally applicable to other types of mowers, as well as to other types of ground working or turf maintenance vehicles (e.g., spreader/sprayers, debris management systems (e.g., blowers, vacuums, sweeper, etc.), and the like) without limitation.

It is noted that the term "comprises" (and variations thereof) does not have a limiting meaning where this term appears in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the mower 10 while the mower is in an operating configuration, e.g., while the mower 10 is positioned such that wheels 106 and 108 rest upon a generally horizontal ground surface 103 as shown in FIG. 1A. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

Figure 1B:
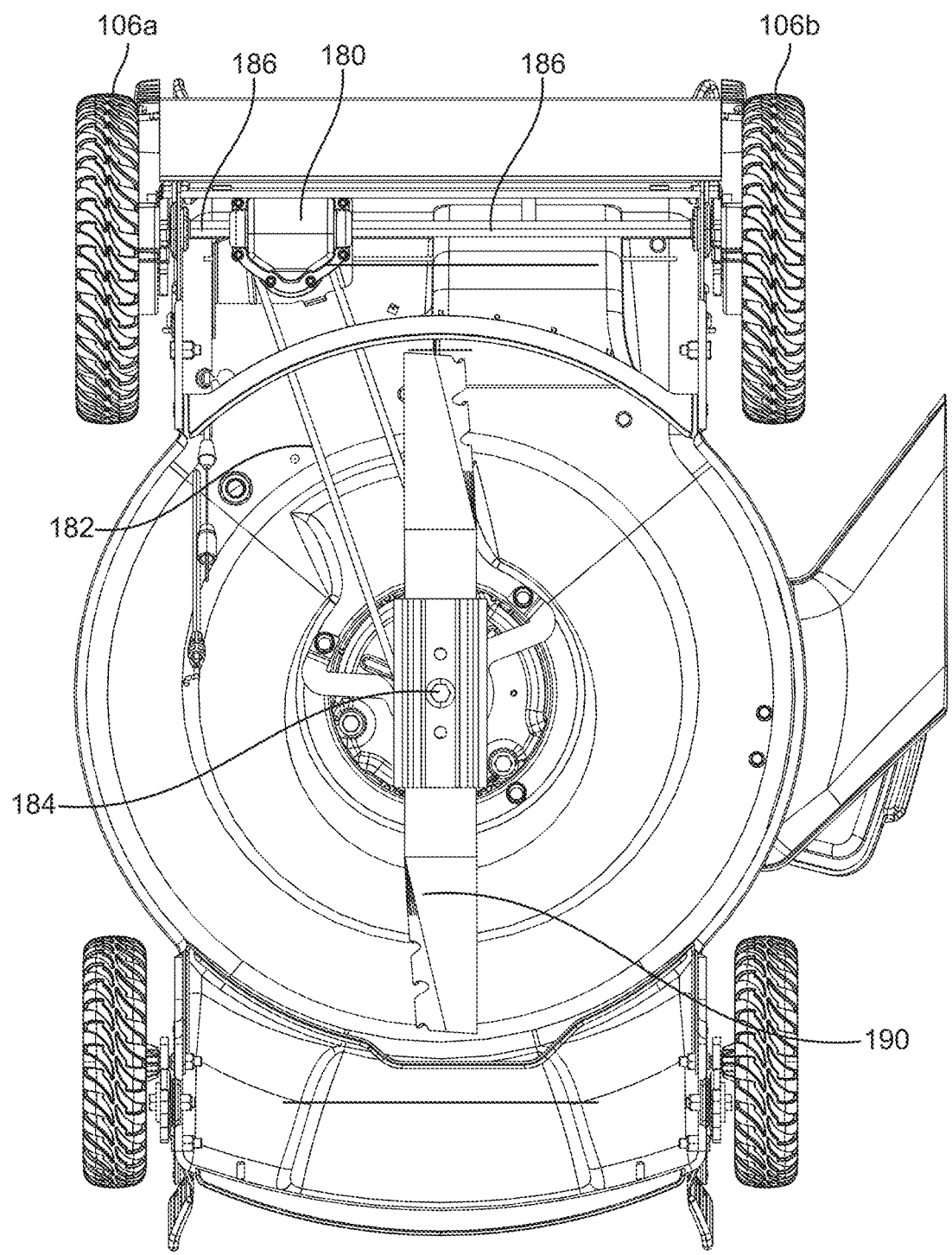
FIG. 1B is bottom plan view of the lawn mower of FIG. 1A.

As shown in FIG. 1A, the mower 10 may include a frame or chassis 102 that defines a cutting deck 117 of the mower 10 and that supports a prime mover 104. While the prime mover 104 may be configured as most any source of power (e.g., an internal combustion engine), it is, in the embodiment shown, configured as an electric motor. The chassis 102 may be supported upon the ground surface 103 by ground-engaging members that, in one embodiment, include left and right ground-engaging drive wheels 106 that may be coupled to left and right sides of a rear portion of the mower 10 (e.g., only left drive wheel 106a visible in FIG. 1A, but see FIG. 1B). The drive wheels 106 may be powered by the prime mover 104 (e.g., via a transmission or the equivalent) so that the drive wheels 106 may rotate (relative to the chassis) and selectively propel the mower 10 over the ground surface 103. For example, the mower may include a variable speed transmission 180 (e.g., as shown in FIG. 1B) supported by the chassis 102. The transmission 180 may selectively rotate at least one of the ground-engaging members (e.g., the drive wheels 106) to effect propulsion of the chassis 102 over the ground surface 103. While a single prime mover (e.g., prime mover 104) may power both the vehicle wheels and the implement (e.g., a cutting deck blade 190), other embodiments may utilize two or more prime movers (e.g., different prime movers for propulsion and for blade power) without departing from the scope of this disclosure. In the illustrated embodiment, a pair of front ground-engaging members (e.g., front wheels 108a, 108b) may support a front portion of the mower 10 in rolling engagement with the ground surface 103. Of course, other drive configurations (e.g., front wheel or all-wheel drive), are certainly contemplated within the scope of this disclosure.

As shown in FIG. 1B, the transmission 180 may be driven by a belt 182 from a drive shaft 184 of the prime mover 104 (e.g., shown in FIG. 1A). The drive shaft 184 may also be coupled to the cutting deck blade 190 such that the cutting deck blade rotates at the same rotational velocity as the drive shaft 184. The transmission 180 may include an axle 186 to translate power from the drive shaft 184 (e.g., via the belt 182) to the drive wheels 106. Accordingly, the prime mover 104 may power the implement (e.g. the cutting deck blade 190) directly through the drive shaft 184 and may power the vehicle wheels (e.g., drive wheels 106) indirectly through the belt drive 182 (via the transmission 180 and the axle 186). In one or more embodiments, the transmission 180 may include mechanical gear drive transmissions that use various speed reduction stages to reduce the relatively high rotational speed of the drive shaft 184 to a lower speed suitable for a self-propelling mower at ground speeds that match the walking pace of the user.

An implement adapted to perform a maintenance task, e.g., the lawn mower cutting deck 117, may be part of, or otherwise carried by, the chassis 102 of the mower 10, e.g., generally between the drive wheels 106 and the front wheels 108. The cutting deck 117 may form a housing that defines a downwardly-opening cutting chamber (as is known in the art). The cutting chamber may partially surround one or more rotatable cutting blades (not shown) powered by the prime mover. During operation, power is selectively delivered to the cutting blade and the drive wheels 106, whereby the cutting blade rotates at a speed sufficient to sever grass and other vegetation as the deck passes over the ground surface 103. Typically, the cutting deck includes an operator-selectable height-of-cut control system to allow deck height adjustment relative to the ground surface 103.

Further, the mower 10 may include a control system 100 to assist in controlling the mower 10 (e.g., assists in guiding and propelling the mower 10 across the ground surface 103). The control system 100 may include a handle assembly 120 extending from the chassis 102 so that an operator can guide the mower 10 across the ground surface 103. For example, the handle assembly 120 may include a handle member 130 extending upwardly and rearwardly from the chassis 102 (e.g., to a position behind the chassis 102 proximate an operator walking behind the mower 10).

The handle member 130 may include at least one handle tube 136 extending between a lower end 132 and an upper end 134 along a longitudinal axis 135. In some embodiments, the handle member 130 may include a left handle tube 136a and a right handle tube 136b spaced apart from one another. The lower end 132 (e.g., left lower end 132a and right lower end 132b) of the handle member 130 may be attached to the chassis 102 and the upper ends 134 of the handle member 130 may be positioned to be proximate the operator using the mower 10. In some embodiments, the upper end 134 of the handle member 130 may extend between, and join, the left and right handle tubes 136a, 136b.

The control system 100 may also include a speed control apparatus 140 that is adapted to activate the transmission of the mower 10 to propel the chassis 102 across the ground surface 103. The speed control apparatus 140 may include a control grip 150 operably connected to, and translatable along, (and, e.g., positioned at or near the upper end 134 of) the handle member 130. For example, the control grip 150 may include a left control grip leg 152a and a right control grip leg 152b movably coupled to the left and right handle tubes 136a, 136b, respectively. As a result, the control grip 150 may be adapted to move relative to the handle member 130.

Further, the control grip 150 may include a cross bar 154 extending between the left and right control grip legs 152a, 152b and positioned such that the operator can apply a force to the control grip 150 through the cross bar 154. The control grip 150 may also be operably coupled to the transmission such that translation of the control grip 150 (relative to the handle member 130) activates the transmission to proportionally propel the chassis 102 (e.g., via prime mover power) in the forward direction when the control grip 150 is translated downwardly along the handle member 130 towards the chassis 102 (e.g., by the operator).

The control system 100 may further include a lockout apparatus 160 movably attached to the handle member 130. The lockout apparatus 160 may be positioned between the control grip 150 and the chassis 102 of the mower 10. The lockout apparatus 160 may be adapted to selectively and physically restrict movement of the control grip 150 relative to the handle member 130 (e.g., to prevent the control grip 150 from activating the transmission to propel the mower 10). For example, the lockout apparatus 160 may be configured or adapted to contact (e.g., directly contact or indirectly contact) the control grip 150 to restrict the movement of the control grip 150 relative to the handle member 130. The lockout apparatus 160 illustrated in FIG. 1A is positioned on the right handle tube 136b, but could be positioned on the left handle tube 136a. Further, only one lockout apparatus 160 may be needed to restrict movement of the control grip 150 relative to the handle member 130 (e.g., because the control grip 150 is one piece extending between the handle tubes 136a, 136b). However, in some embodiments, the control system 100 may include a lockout apparatus 160 positioned on both the left and right handle tubes 136a, 136b. Moreover, in some embodiments, an additional lockout apparatus may be used to restrict movement of the speed control apparatus 140 in a reverse or backwards direction.

Figure 2A:
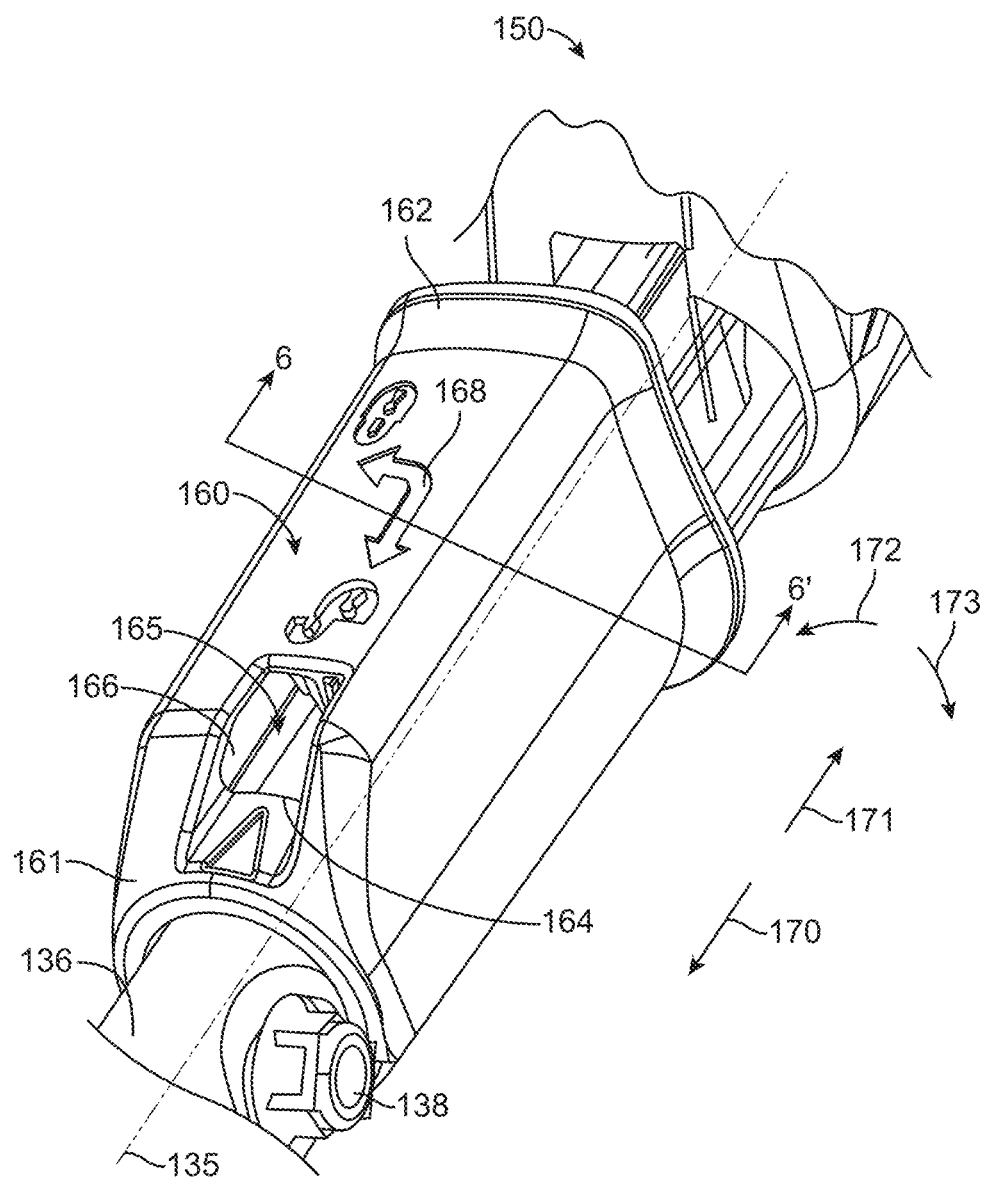
FIG. 2A is an enlarged perspective view of an illustrative lockout apparatus of the control system of FIG. 1A.
Figure 2B:
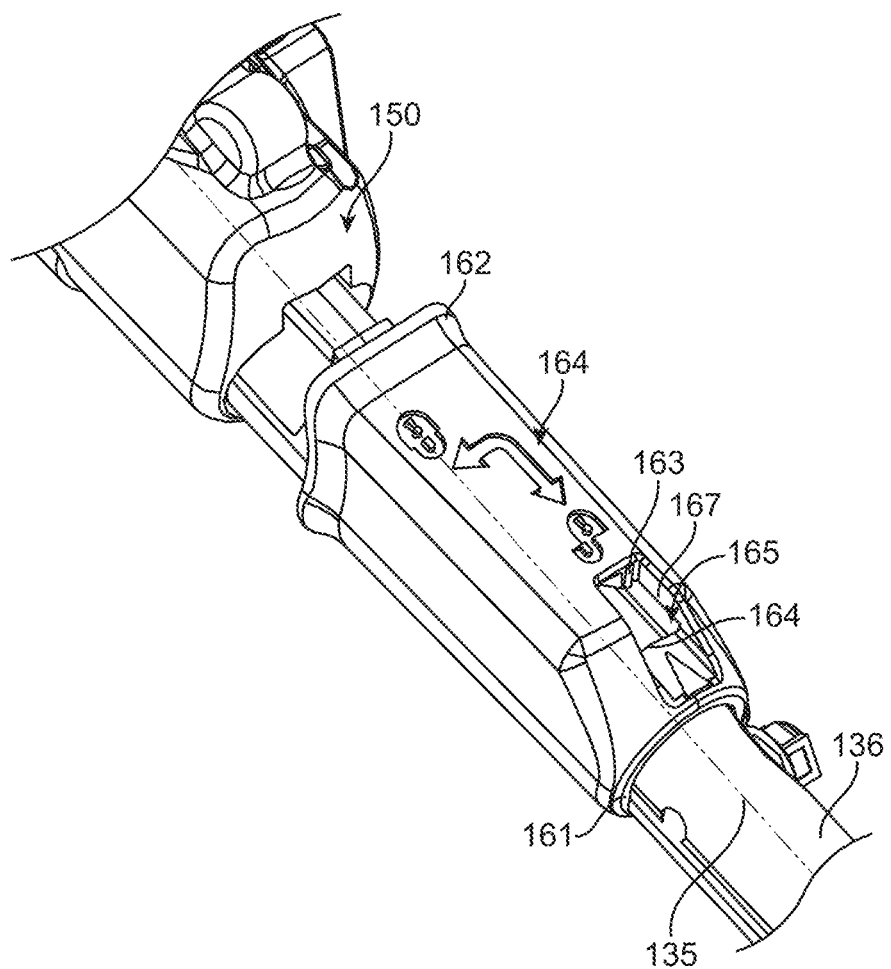
FIG. 2B is another perspective view of the lockout apparatus of FIG. 2A.

As illustrated in FIGS. 2A and 2B, the lockout apparatus 160 extends between a first end portion 161 and a second end portion 162. The lockout apparatus 160 may be of any suitable shape and/or size. In the illustrated embodiments, the lockout apparatus 160 may form a tubular shape such that it defines a passageway extending between the first and second end portions 161, 162 that may be adapted to receive the handle tube 136. The passageway of the lockout apparatus 160 may be sized such that the lockout apparatus 160 may move (e.g., slide) relative to the handle tube 136 without binding. In some embodiments, the lockout apparatus 160 may surround at least a portion of the handle tube 136 (e.g., surround the entire, or less than the entire, circumference of the handle tube 136). For example, the lockout apparatus 160 may be c-shaped such that it is adapted to be removed from, and attached to, the handle tube 136 as desired. In other embodiments, the lockout apparatus 160 may completely surround or enclose the handle tube 136 (e.g., be permanently attached). In other words, the lockout apparatus 160 may be prevented from separating from the handle tube 136 without disassembly/destroying the lockout apparatus 160 and/or the handle tube 136.

The lockout apparatus 160 may also define an aperture 165 formed in a wall of the lockout apparatus 160 between the first and second end portions 161, 162. As shown in FIGS. 2A and 2B, the aperture 165 may be located proximate the first end portion 161, but the aperture 165 could be located at any suitable location along the lockout apparatus 160. The aperture 165 may be defined within the lockout apparatus 160 by an engagement edge surface 164 proximate the front of the aperture 165 and a side opening 166 as illustrated in FIG. 2A, and a stop surface 163 and a side surface 167 as illustrated in FIG. 2B.

Figure 3:
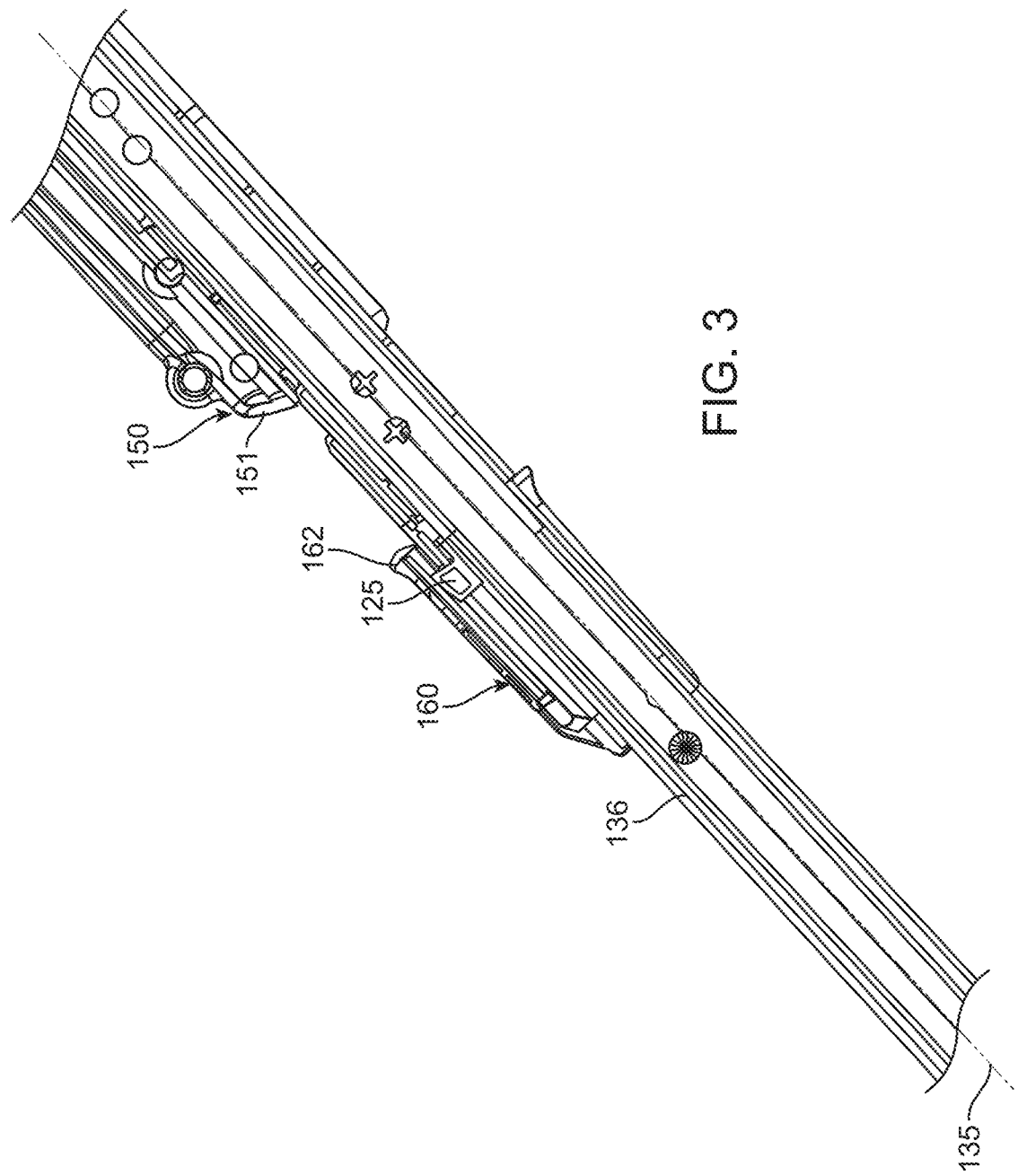
FIG. 3 is a cross-sectional view of the control system of FIG. 1A taken along line 3-3' of FIG. 1A when the lockout apparatus is in an unlocked position and a speed control apparatus is in a neutral position.
Figure 4:
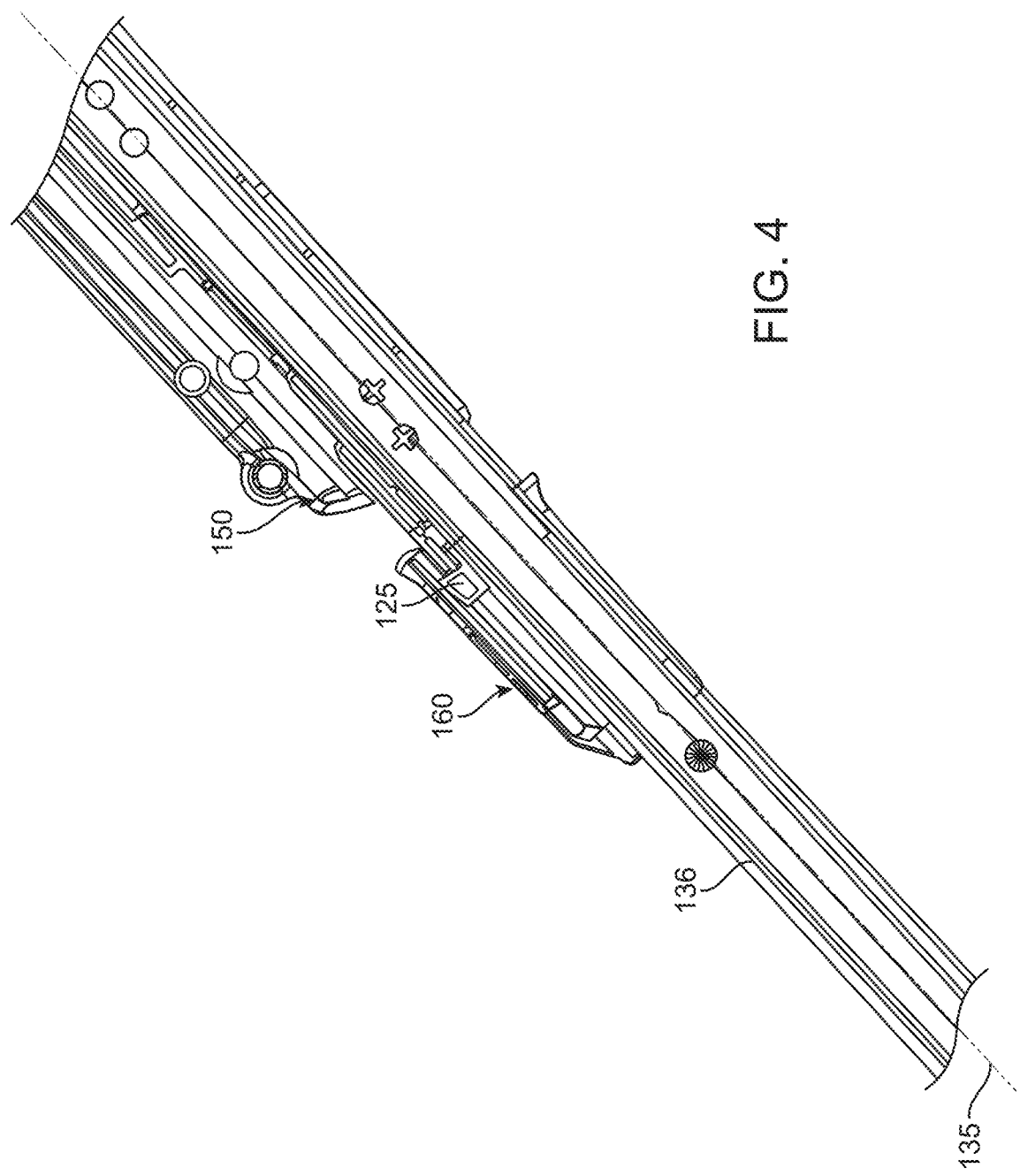
FIG. 4 is a cross-sectional view similar to FIG. 3, but with an illustrative speed control apparatus in a forward position.
Figure 5:
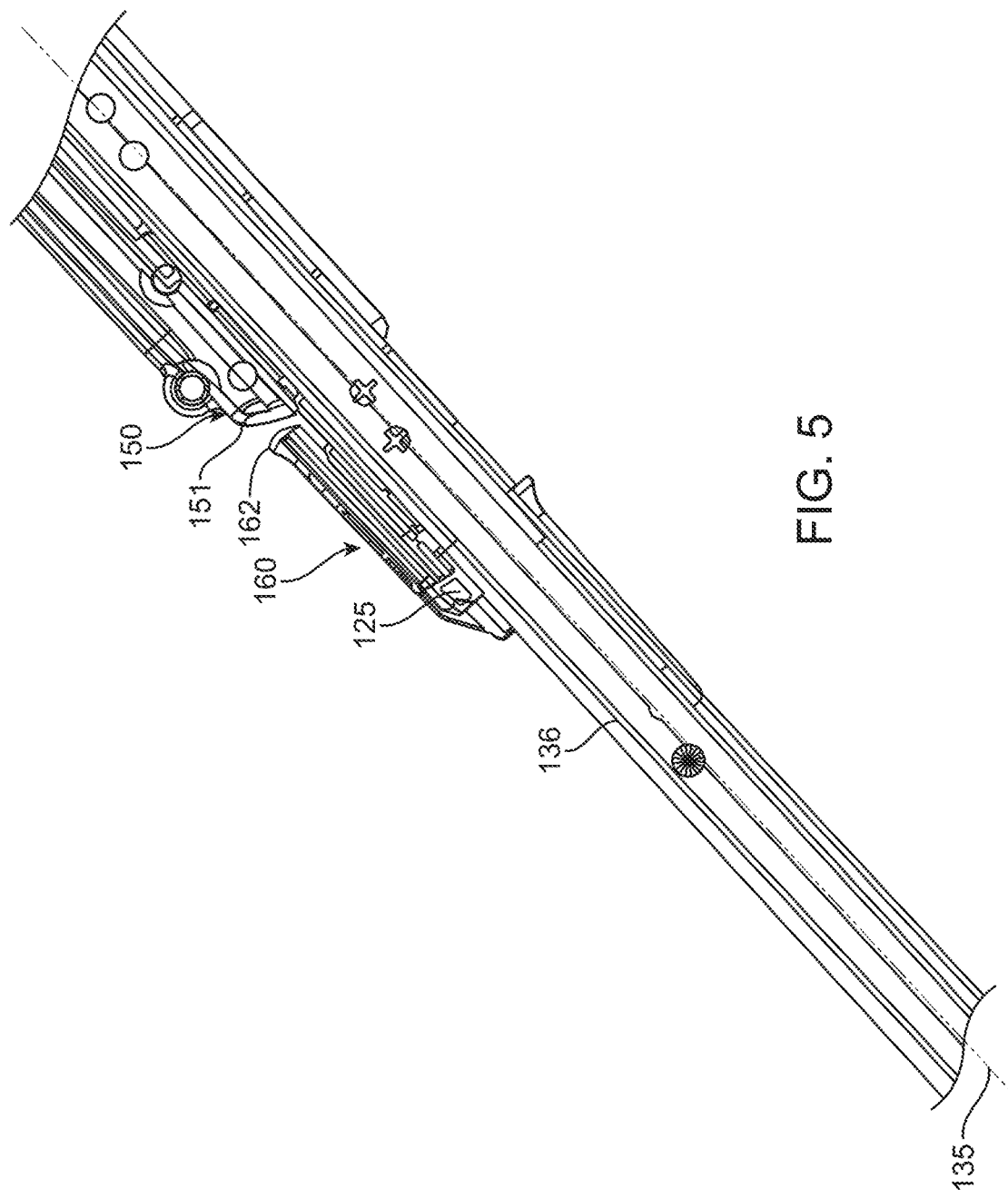
FIG. 5 is a cross-sectional view similar to FIG. 3, but with the lockout apparatus in a locked position (thereby, restricting the speed control apparatus to a neutral position)

Additionally, the handle assembly 120 may include an engagement portion 125 (e.g., as illustrated in FIGS. 3-5) positioned along the handle member 130 (e.g., along the handle tube 136) and configured to interact or selectively engage with the aperture 165 of the lockout apparatus 160. In other words, the lockout apparatus 160 may be moved such that the aperture 165 of the lockout apparatus 160 engages (e.g., is positioned over) the engagement portion 125, thereby fixing the lockout apparatus 160 in a specific position as further described below. The engagement portion 125 may be any suitable shape and/or size and may be described as a notch or protrusion extending from the handle tube 136.

The lockout apparatus 160 may be configured to move linearly and/or rotationally relative to the handle member 130 (e.g., the handle tube 136). For example, the lockout apparatus 160 may translate along the handle tube 136 (e.g., along the longitudinal axis 135 of the handle tube 136) in opposite directions 170 (e.g., towards a forward position) and 171 (e.g., towards a rearward position). Specifically, the lockout apparatus 160 may move towards or away from the chassis 102 (e.g., away from or towards the control grip 150). Additionally, as shown in FIG. 2A, the handle member 130 may include a lockout stop 138 (e.g., a bolt, a plastic portion, etc.) protruding from the handle tube 136 such that the lockout stop 138 prevents or restricts the lockout apparatus 160 from moving past a specified point along the handle tube 136. For example, the lockout stop 138 may abut the lockout apparatus 160 to physically restrict the lockout apparatus 160 from moving towards the chassis 102. Also, for example, the lockout apparatus 160 may rotate about the handle tube 136 (e.g., about the longitudinal axis 135 of the handle tube 136). Specifically, the lockout apparatus 160 may rotate clockwise or counter clockwise as indicated by the directional arrows 172, 173 (as shown in FIG. 2A).

The lockout apparatus 160 may be selectively positioned by the operator relative to the control grip 150 (e.g., along the handle member 130). For example, the lockout apparatus 160 may be movable between a locked position (e.g., as illustrated in FIG. 5) and an unlocked position (e.g., as illustrated in FIGS. 3 and 4). When in the locked position, the lockout apparatus 160 may physically restrict movement of the control grip 150 relative to the handle member 130. And, when in the unlocked position, the lockout apparatus 160 may allow (e.g., not interfere with) the movement of the control grip 150 relative to the handle member 130. Furthermore, when the lockout apparatus 160 is in the unlocked position, the lockout apparatus 160 may move along the handle tube 136 in the direction 170 (e.g., due to gravity) and the lockout stop 138 may position or restrict the lockout apparatus 160 to a specified position (e.g., to prevent the lockout apparatus 160 from moving all the way to the chassis 102). However, the lockout apparatus 160 would still be free to move in direction 171, away from the chassis 102.

The lockout apparatus 160 shown in FIG. 3 is in the unlocked position (e.g., spaced apart from the control grip 150). For example, the second end portion 162 of the lockout apparatus 160 is spaced apart from a first end portion 151 of the control grip 150 (e.g., the portion of the control grip 150 closest to the chassis 102 may be described as the first end portion 151 of the control grip 150). When the lockout apparatus 160 is in the unlocked position, the control grip 150 is free to move or translate along the handle member 130 (however, the lockout apparatus 160 may be restricted from moving all the way along the handle member 130 to the chassis 102 by the lockout stop 138, as shown in FIG. 2A). For example, as shown in FIG. 4, the lockout apparatus 160 is in the unlocked position and the control grip 150 is displaced towards the chassis 102 (and, therefore, towards the unlocked lockout apparatus 160) such that the transmission may be activated (e.g., to propel the mower 10 forward). In other words, the lockout apparatus 160 does not interfere with the forward motion of the control grip 150 when the lockout apparatus 160 is in the unlocked position (e.g., as shown in FIG. 4).

The lockout apparatus 160 shown in FIG. 5 is in the locked position (e.g., adjacent to or in contact with (e.g., direct contact) the control grip 150) to effectively restrict the movement of the control grip 150 relative to the handle member 130. For example, the first end portion 151 of the control grip 150 may contact the second end portion 162 of the lockout apparatus 160 to prevent the control grip 150 from moving relative to the handle member 130. As a result, when a force is applied to the control grip 150 that would otherwise move the control grip 150 towards the chassis 102 along the handle tube 136, the control grip 150 is prevented from such movement. As such, activation of the transmission to propel the mower 10 (e.g., in a neutral position) is obstructed because the lockout apparatus 160 is restricting movement of the control grip 150.

The lockout apparatus 160 (e.g., surfaces surrounding the aperture 165) may engage or abut the engagement portion 125 to fix or secure the lockout apparatus 160 in the locked position. For example, the lockout apparatus 160 may be selectively moved (e.g., linearly or rotationally) such that the engagement portion 125 is positioned within the aperture 165. For example, the lockout apparatus 160 may be rotated such that the engagement portion 125 passes through the side opening 166 (e.g., see FIG. 2A) to position the engagement portion 125 within the aperture 165. The engagement edge surface 164, the stop surface 163, and the side surface 167 may abut the engagement portion 125 such that the lockout apparatus 160 is restricted from moving in a direction towards those features when the engagement portion 125 is positioned within the aperture 165.

For example, the engagement edge surface 164 may abut the engagement portion 125 to prevent the lockout apparatus 160 from moving further away from the chassis 102, the stop surface 163 may abut the engagement portion 125 to prevent the lockout apparatus 160 from moving further towards the chassis 102, and the side surface 167 may abut the engagement portion 125 to prevent the lockout apparatus 160 from rotating in one direction about the handle tube 136. As a result, the lockout apparatus 160 may only be rotated in the other direction such that, when desired, the engagement portion 125 passes through the side opening 166 to move the lockout apparatus 160 out of the locked position. As shown in FIGS. 2A and 2B, the side opening 166 is positioned on the outside (e.g., in relation to the mower 10) of the aperture 165, however, the side opening 166 could be positioned on the inside or, in some embodiments, be positioned on both sides of the aperture 165.

In other embodiments, the engagement portion 125 may be adapted to snap into place (e.g., into the aperture 165) when the lockout apparatus 160 is moved over the engagement portion 125 to, e.g., to place the lockout apparatus 160 in the locked position. For example, the engagement portion 125 may define a tapered or sloped surface that, upon entering the aperture 165, snap-fits to hold the lockout apparatus 160 in place. In such embodiments, the lockout apparatus 160 may subsequently be rotated (e.g., as described herein) to move the lockout apparatus 160 out of the locked position.

Furthermore, when the lockout apparatus 160 moves (e.g., via manual operator interaction) from the unlocked position to the locked position, the lockout apparatus 160 may be configured to both translate away from the chassis along the handle tube 136 (e.g., along the longitudinal axis 135) and rotate about the handle tube 136 (e.g., about the longitudinal axis 135). For example, the lockout apparatus 160 may first move upwardly along the handle tube 136 and then rotate such that the engagement portion 125 is positioned within the aperture 165. When the engagement portion 125 is positioned in the aperture 165, the lockout apparatus 160 is in the locked position. It is noted that, in other embodiments, the lockout apparatus 160 may move from the unlocked position to the locked position in any other suitable manner.

On the other hand, when the lockout apparatus 160 moves from the locked position to the unlocked position, the lockout apparatus 160 may be rotated such that the engagement portion 125 exits the aperture 165 (e.g., as described herein) and then the lockout apparatus 160 may be moved downwardly along the handle tube 136 towards the chassis 102 to the unlocked position (e.g., restricted from moving all the way to the chassis 102 by the lockout stop 138). It is noted that, in other embodiments, the lockout apparatus 160 may move from the locked position to the unlocked position in any suitable manner. Further, the lockout apparatus 160 may include indicia 168 to instruct the operator how to lock or unlock the lockout apparatus 160.

Figure 6:
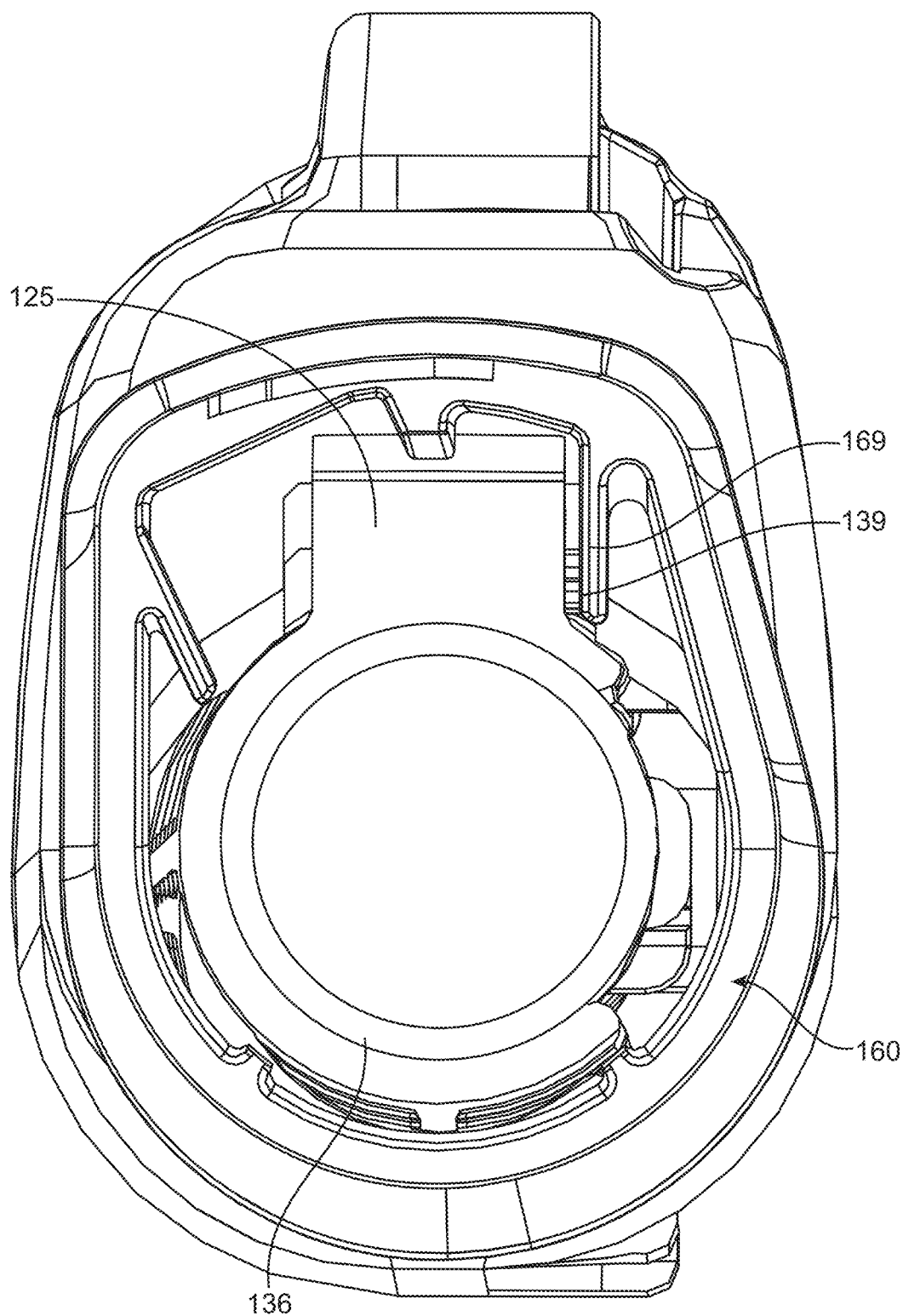
FIG. 6 illustrates a cross-sectional view of the lockout apparatus system of FIG. 2A taken along line 6-6' of FIG. 2A.

Additionally, as illustrated in the cross-sectional view of FIG. 6, the lockout apparatus 160 may include a lockout track 169 and the handle member 130 may include a handle track 139. The lockout track 169 may be configured to slidably engage the handle track 139 such that the lockout apparatus 160 moves linearly when translating along the handle tube 136. After the lockout apparatus 160 translates up the handle tube 136, the handle track 139 and the lockout track 169 may allow the lockout apparatus 160 to rotate relative to the handle tube 136. As such, the handle track 139 and the lockout track 169 may prevent the lockout apparatus 160 from moving in undesired directions when transitioning between the locked position and the unlocked position. Further, in one or more embodiments, the handle tube 136 and/or the lockout apparatus 160 may include one or more ribs to increase friction as the lockout apparatus 160 rotates into the locked position. The additional friction of the one or more ribs between the lockout apparatus 160 and the handle tube 136 may help to prevent the lockout apparatus 160 from accidently vibrating loose into the unlocked position.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A control system for a ground working vehicle, wherein the system comprises:
   a handle assembly comprising a handle member extending upwardly and rearwardly from a chassis of the vehicle;
   a speed control apparatus comprising a control grip operably connected to, and translatable along, the handle member, wherein translation of the control grip activates a transmission to move the chassis in a forward direction when the control grip is translated downwardly along the handle member towards the chassis; and
   a lockout apparatus movably attached to the handle member such that the lockout apparatus translates along and rotates about the handle member, wherein the lockout apparatus is adapted to selectively and physically restrict movement of the control grip relative to the handle member.

2. The system of claim 1, wherein the ground working vehicle comprises an electric power mower.

3. The system of claim 1, wherein the lockout apparatus is movable between a locked position and an unlocked position, wherein, when in the locked position, the lockout apparatus physically restricts the movement of the control grip relative to the handle member; and when in the unlocked position, the lockout apparatus allows the movement of the control grip relative to the handle member.

4. The system of claim 3, wherein the lockout apparatus is configured to both translate upwardly along and rotate about the handle member when the lockout apparatus moves from the unlocked position to the locked position.

5. The system of claim 4, wherein the handle assembly comprises an engagement portion positioned along the handle member, wherein the lockout apparatus abuts the engagement portion when rotated about the handle member to secure the lockout apparatus in the locked position.

6. The system of claim 3, wherein the lockout apparatus is adjacent to or in contact with the control grip when in the locked position, and the lockout apparatus is spaced apart from the control grip when in the unlocked position.

7. The system of claim 1, wherein the lockout apparatus is positioned between the control grip and the chassis of the vehicle.

8. A walk-behind power mower comprising:
a chassis supported upon a ground surface by a plurality of ground-engaging wheels;
a prime mover supported by the chassis;
a handle assembly comprising a handle member extending upwardly and rearwardly from the chassis, wherein the handle member comprises a lower end attached to the chassis and an upper end, and wherein the handle member comprises at least one handle tube extending between the upper and lower ends of the handle member;
a variable speed transmission supported by the chassis, wherein the transmission selectively rotates at least one of the ground-engaging wheels to effect propulsion of the chassis over the ground surface;
a speed control apparatus comprising a control grip positioned at or near the upper end of, and translatable along, the handle member, wherein translation of the control grip downwardly along the handle member activates the transmission to effect propulsion the chassis in a forward direction; and
a lockout apparatus movably attached to the handle member, wherein the lockout apparatus is adapted to selectively and physically restrict translation of the control grip along the handle member, and wherein the lockout apparatus surrounds at least a portion of the at least one handle tube.

9. The mower of claim 8, wherein the lockout apparatus is adapted to physically restrict the movement of the control grip relative to the handle member such that the control grip is prevented from activating the transmission.

10. The mower of claim 8, wherein the lockout apparatus is adapted to be selectively positioned such that the lockout apparatus physically restricts the movement of the control grip relative to the handle member.

11. The mower of claim 8, wherein the lockout apparatus is movable between a locked position and an unlocked position, wherein, when in the locked position, the lockout apparatus physically restricts the movement of the control grip relative to the handle member; and when in the unlocked position, the lockout apparatus allows with the movement of the control grip relative to the handle member.

12. The mower of claim 11, wherein the lockout apparatus is configured to both translate along and rotate about a longitudinal axis of the at least one handle tube, wherein the lockout apparatus is configured to both translate away from the chassis along the longitudinal axis and rotate about the longitudinal axis when the lockout apparatus moves from the unlocked position to the locked position.

13. The mower of claim 12, wherein the handle assembly comprises an engagement portion positioned along the handle member, and wherein the lockout apparatus engages the engagement portion when rotated about the longitudinal axis to fix the lockout apparatus in the locked position.

14. The mower of claim 11, wherein the lockout apparatus is adjacent to or in contact with the control grip when in the locked position, and the lockout apparatus is spaced apart from the control grip when in the unlocked position.

15. The mower of claim 8, wherein the lockout apparatus completely surrounds the at least one handle tube.

16. The mower of claim 8, wherein the lockout apparatus is positioned between the control grip and the chassis.

17. The mower of claim 8, wherein the lockout apparatus is configured to contact the control grip to restrict the movement of the control grip relative to the handle member.

18. The mower of claim 8, wherein the lockout apparatus comprises a lockout track and the handle member comprises a handle track, wherein the lockout track is configured to slidably engage the handle track.

19. A walk-behind power mower comprising:
a chassis supported upon a ground surface by a plurality of ground-engaging wheels;
a prime mover supported by the chassis;
a handle assembly comprising a handle member extending upwardly and rearwardly from the chassis, wherein the handle member comprises a lower end attached to the chassis, an upper end, and at least one handle tube extending between the lower and upper ends;
a variable speed transmission supported by the chassis, wherein the transmission selectively rotates at least one of the ground-engaging wheels to effect propulsion of the chassis over the ground surface;
a speed control apparatus comprising a control grip positioned at or near the upper end of, and translatable along, the handle member, wherein translation of the control grip downwardly along the handle member activates the transmission to effect propulsion of the chassis in a forward direction; and
a tubular lockout apparatus movably attached to and surrounding at least a portion of the at least one handle tube between the chassis and the control grip, wherein the lockout apparatus is adapted to selectively and physically restrict movement of the control grip relative to the handle member such that the control grip is prevented from activating the transmission,
wherein the lockout apparatus is configurable between a locked position and an unlocked position, wherein, when in the locked position, the lockout apparatus is adjacent to or in contact with the control grip and physically restricts the movement of the control grip relative to the handle member, and wherein, when in the unlocked position, the lockout apparatus is spaced apart from and allows the movement of the control grip relative to the handle member.

* * * * *